United States Patent [19]
Abrams et al.

[11] Patent Number: 4,750,156
[45] Date of Patent: Jun. 7, 1988

[54] NOISE SUPPRESSION DURING SEISMIC EXPLORATION

[75] Inventors: Michael L. Abrams, Houston; Charles G. Rice, Sugarland; Paul E. Carroll; Roy W. James, III, both of Houston, all of Tex.

[73] Assignee: Input/Output, Inc., Stafford, Tex.

[21] Appl. No.: 835,140

[22] Filed: Mar. 3, 1986

[51] Int. Cl.$^4$ .............................................. G01V 1/00
[52] U.S. Cl. ...................................... 367/42; 367/43; 367/45; 364/421
[58] Field of Search ...................... 367/21, 22, 23, 24, 367/38, 39, 40, 41, 42, 45, 43, 47, 48, 49, 65, 66, 67, 900, 901; 364/421, 422

[56] References Cited

U.S. PATENT DOCUMENTS

| | | | |
|---|---|---|---|
| 3,704,444 | 11/1972 | Schmitt | 340/15.5 |
| 3,924,260 | 12/1975 | Braham et al. | 367/67 |
| 4,016,557 | 4/1977 | Zitelli et al. | 367/67 X |
| 4,059,818 | 11/1977 | Kostelnicek | 340/15.5 |
| 4,232,379 | 11/1980 | Ensing | 367/43 |
| 4,243,045 | 1/1981 | Mass | 128/696 |
| 4,243,935 | 1/1981 | McCool et al. | 367/901 X |
| 4,326,262 | 4/1982 | Clement | 367/38 X |
| 4,393,369 | 7/1983 | Davies | 367/67 X |
| 4,527,261 | 7/1985 | Smither | 367/76 |
| 4,544,899 | 10/1985 | Townsend | 333/17 |

OTHER PUBLICATIONS

Widrow et al., Proc. of IEEE, vol. 63, No. 12, Dec. 75, pp. 1692-1716.
Glover, IEEE Transactions, vol. ASSP-25, No. 6, Dec. 77.
Heinonen, JEET Transactions, vol. CAS-31, No. 5, May 84.
Kobatake, CH 1746.7/82/0000.1424, 1982, IEEE.
International Search Report dated 7/20/87 for PCT/US87/00307.

Primary Examiner—Deborah L. Kyle
Assistant Examiner—Brian S. Steinberger
Attorney, Agent, or Firm—Michael P. Breston

[57] ABSTRACT

The system for suppressing an ambient noise signal which comtaminates a desired signal includes a noise pickup detector for detecting the ambient noise signal. A noise discriminator processes the detected noise signal into noise data. A reference noise generator converts the noise data into a reference noise signal. The noise generator automatically adjusts the reference noise signal to correspond with changes in the noise signal as it is being detected. A filter filters the reference noise signal into an error signal which is adapted to remove the noise signal from the contaminated signal. A cross-correlator cross-correlates the contaminated signal with the reference noise signal and adjusts the filter to produce the required error signal.

26 Claims, 2 Drawing Sheets

NOISE SUPPRESSION DURING SEISMIC EXPLORATION

BACKGROUND OF THE INVENTION

1. Field of the Invention

This invention relates in general to the art of noise suppression by a summation process and, more particularly, to a method and apparatus especially adapted to remove interfering, continuously-changing, multi-frequency periodic noise signals from contaminated seismic signals while they are being detected during seismic exploration.

2. Description of the Prior Art

A seismic signal detected from the earth includes: (1) a desired seismic component having amplitude, phase and frequency variations representing seismic information, (2) an undesirable multi-frequency, electrical power-grid-related noise component, and (3) other such environmental and instrument-related noise components.

As is well known, in a seismic data acquisition channel, the amplitude of the noise component can be orders of magnitude larger than the amplitude of the seismic component. This fact imposes a reduction in the channel's amplifier gains, resulting in a reduced dynamic range and, hence, a decreased resolution for the overall seismic signal. Such self-imposed reduced gain causes the unavoidable self-generated noise within the channel's amplifiers to increase the channel's noise-to-signal ratio.

Therefore, unless noise is effectively reduced from the contaminated seismic signal, the quality of the seismic data being acquired during seismic exploration and its subsequent interpretation will deteriorate.

The oldest and yet still the most widely used noise suppressor for seismic channels is the notch filter. Periodic noise becomes attenuated according to the depth and width of the notch filter whose center frequency is nominally set to the fundamental frequency of the predominant noise signal, typically the 60 Hz frequency of the local power grid.

In many geographic areas, however, the second or third harmonic of the 60 Hz signal is the predominant noise frequecy. As a consequence, a distinct notch filter is required for each harmonic or subharmonic of the predominant fundamental frequency. Hereinafter, the fundamental frequency and its harmonics and/or subharmonics will be collectively called in short the "noise signal".

Narrow-band analog filters are expensive and difficult to build because they require closely matched components. For this practical reason, most notch filters have a relatively wide bandwidth, say 10 Hz, and cause undesirable phase shifting characteristics in the seismic signal being processed therethrough.

U.S. Pat. No. 3,704,444 describes a seismic channel which utilizes its digital data processor network to perform a double function: (1) to process the digitized seismic data in the seismic channel, and (2) to produce a feedback error signal which is subtracted from the incoming analog seismic signal at the input to the seismic channel. It is believed that such a system, because of its inherent structural limitations, would lack flexibility in adapting to multiple and changing noise frequencies. Therefore, such a system even at best would appear to be the equivalent of a notch filter which is suitable for only a single dominant frequency.

The above described and other well-known problems, associated with notch filters or their equivalents, have prompted attempts to optimize the entire data acquisition instrumentation within the seismic channel in the hope of being able to eliminate notch filters altogether.

One such approach uses a "line balancer" which usually takes the form of a bridge having a pair of variable impedance arms that are electrically connected between each wire within the seismic cable and ground. These impedances are adjusted to increase the common mode noise rejection at the dominant noise frequency, in order to obtain less contamination of the difference mode signal by the common mode noise signal.

But, working with a large number of line balancers requires tedious and very time-consuming manual adjustments. Also, because ambient noise tends to change continuously, the first-adjusted balancer will require readjustment after the last balancer is adjusted and before seismic energy becomes injected into the ground. Such a procedure can become a never-ending task, especially for a seismic data gathering system having 100 or more seismic channels.

The common mode attenuator is a more recent derivative of the line balancer. It requires amplifying the common mode signal with two separate amplifiers. One amplified signal is applied to one wire of the seismic cable through a resistor, and the other signal is applied to the same wire through a capacitor. The outputs of the two amplifiers are also inverted. One inverted signal is applied to the other wire of the seismic cable through a resistor, and the other inverted signal is also applied to the other wire through a capacitor. The gains for these two common mode amplifiers are determined by correlating the difference mode signal with the common mode signal in order to balance the impedance of the seismic cable at the dominant correlated frequency. But, because the impedance of a seismic cable constitutes a complex quantity, varying with frequency, temperature, etc., the cable will still remain unbalanced for frequencies other than the correlated frequency.

It has also been proposed to synthesize a nulling signal having a predetermined, fixed, single frequency which is substantially equal to the fundamental frequency of the anticipated periodic noise signal. This nulling signal is manually adjusted to have the desired amplitude and phase. Even at best, only the anticipated predominant fundamental noise frequency may be suppressed with such a nulling signal.

In sum, the known noise-suppression systems still have serious drawbacks, such as: (1) introduction into the seismic channel of substantial distortions in the phase, frequency, and/or amplitude characteristics of the seismic signal being gathered; (2) need for time-consuming manual adjustments; and (3) noise cancellation limited to only a single anticipated predominant fundamental noise frequency.

Effective and practical noise suppression must be capable of removing the harmful effects produced by an unanticipated dominant noise frequency and/or its harmonics and subharmonics with a minimum amount of seismic signal degradation. For example, a notch filter, even when well tuned, attenuates the 60 Hz power grid noise by about 40 dB, but does not suppress any harmonics and/or subharmonics thereof. At the same time, the notch filter introduces an undesired phase reversal at the center frequency and modifies the amplitudes of the filtered seismic signals over a bandwidth of about 10 Hz on either side of its center frequency.

It is a broad object of the present invention to provide a novel and effective noise suppressor, which is able to sufficiently suppress the harmful effects on the desired seismic signal caused by a continuously-changing, multi-frequency noise signal that contaminates the seismic signal component as it is being gathered within each one of the seismic channels during seismic exploration of the earth.

It is a further object to provide such noise suppression without at the same time introducing into the seismic channel substantial distortions in the phase, frequency, and/or amplitude characteristics of the seismic signal being gathered and without requiring time-consuming manual adjustments to the networks within the noise suppression system.

SUMMARY OF THE INVENTION

The novel system suppresses the effect produced by a contaminating ambient noise signal component on a desired seismic signal component being gathered within a seismic channel and allows the seismic channel to produce a noise free seismic signal.

In a broad sense, the novel noise suppression system includes: a noise detector which monitors the contaminating noise signal; a noise discriminator which processes the monitored noise signal into noise data; a reference noise generator which waveshapes the noise data into a reference noise signal; a signal modifier having adjustable parameters which changes the reference noise signal into an error signal having characteristics which enable the error signal to remove the noise signal from the contaminated seismic signal; and a signal comparator which compares the reference noise signal with the uncontaminated seismic signal and changes the signal modifier's parameters to enable the signal modifier to produce the required error signal.

DETAILED DESCRIPTION OF THE INVENTION

Figure 1:
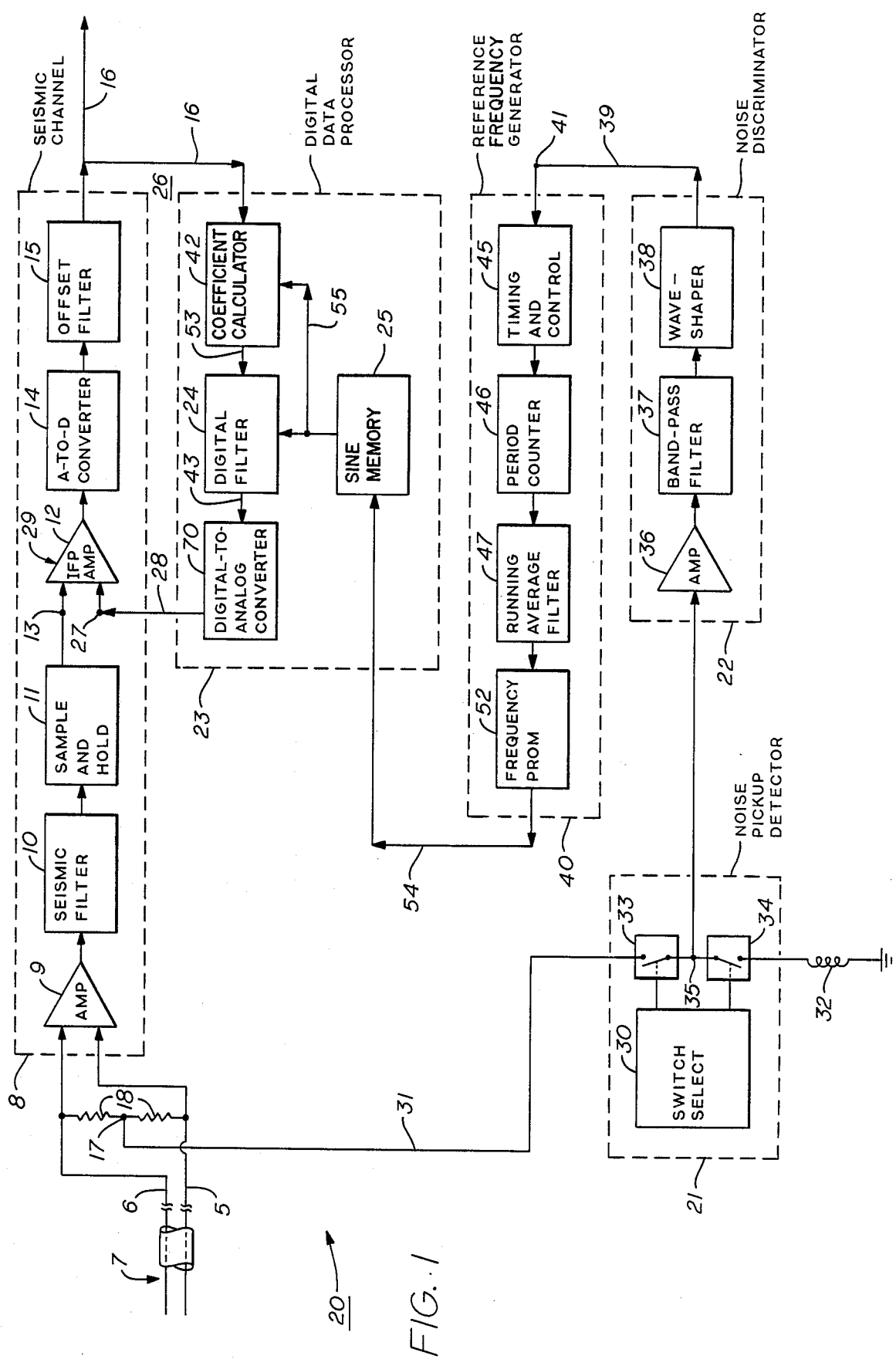
FIG. 1 is a diagrammatic representation in block diagram form of a preferred embodiment of a single seismic channel data acquisition system utilizing the noise suppression system of the present invention.

This invention is of particular utility to seismographic exploration of the earth's subsurface, wherein an energy source (not shown) injects into the earth a seismic acoustic energy signal which propagates downwardly and then becomes reflected from various subsurface earth layers or reflectors.

A seismic energy source for land use is typically either a sweep-generator type vibrator, whose sweep signal is a unique wavetrain, or an impulsive energy source.

The reflected acoustic image signals of the energy source return from the deep reflectors to the surface of the earth where they are detected by seismic transducers, such as geophones or the like (not shown), which generate corresponding electric seismic signals, usually in analog form.

Origin of the Contaminating Noise Signal

The invention and its objects will be better understood from a brief description of the origin of the contaminating periodic noise signals which can be traced in part to the groups of geophones that are electrically coupled to a pair of wires 5,6 of a seismic cable 7 which interconnects geophones, leader cables, couplers, etc. Cable 7 leads to and forms part of a seismic channel 8.

The environment surrounding cable 7 generates ambient electric noise currents which flow into seismic cable 7 through resistive leakage and capacitive coupling between wires 5,6 and ground. Also, magnetic fields can intercept the coils of the geophones and generate voltages at their output terminals. As a result, the common mode signal can have frequencies such as exist around electric power lines, electric railways, cathodic systems for protecting steel structures and other objects, such as buried pipelines, etc. These noise frequencies can be fixed or they can change with time.

Wires 5 and 6 in seismic cable 7 can have different impedances to ground, hence different common mode voltages to ground. These unbalanced common mode voltages become converted to difference mode voltages or noise signals between wires 5 and 6. On the other hand, the seismic signals generated by the geophones also appear at the input to seismic channel 8 as difference mode seismic signals between wires 5 and 6.

The impedance of seismic cable 7 to ground is a complex quantity, varying with frequency, temperature, and other environmental and meteorological conditions. Variations in the impedance imbalance of cable 7 cause variations in the common mode and in the difference mode noise signals. Both types of noise signals contaminate the seismic signals detected by the geophones, as is well known in the art.

The incoming contaminated seismic signals to channel 8 are amplified by a preamplifier 9, filtered by a seismic filter 10, sequentially sampled by a sample-and-hold (S/H) network 11, and amplified by a well-known, instantaneous-floating-point (IFP) difference amplifier 12 having a first input 13 which receives the contaminated analog samples from S/H 11. The output signal from the IFP amplifier 12 is converted by analog-to-digital (A/D) converter 14 into digital data that is filtered by an offset digital filter 15 to provide to its output line 16 contaminated digital seismic data. As thus far described, seismic channel 8 is conventional and further description thereof is believed unnecessary.

General Description of the Suppression System

It is the object of this invention to enable channel 8 to provide to its output line 16 uncontaminated digital seismic data. The novel noise suppression system, generally designated as 20, is especially adapted to remove anticipated and unanticipated, continuously-changing, multi-frequency noise signals which are contaminating the seismic signal components arriving on wires 5 and 6, while they are being gathered by channel 8 during seismic exploration, without at the same time introducing substantial distortions in the phase, frequency, and/or amplitude characteristics into the uncontaminated seismic signal on output line 16, and without requiring time-consuming manual adjustments.

System 20 broadly comprises a noise pickup detector 21 which monitors the contaminating ambient noise and feeds it to a noise discriminator 22 whose output noise data is processed by a reference noise generator 40 to produce a reference noise signal which is supplied to a digital data processor 23 within a feedback loop 26 which includes a digital filter 24, a noise simulation network 25, and a cross-correlator 42.

Feedback loop 26 interacts between channel 8 and processor 23 and provides to a second input 27 of IFP amplifier 12 a noise-cancelling error signal on line 28 having the required frequency, amplitude and phase to effectively suppress the noise signal present on the seismic data applied to the first input 13. Amplifier 12 constitutes a summing network 29.

Digital filter 24 has weights or coefficients, herein sometimes also called "parameters", which are being updated continuously by the output on line 53 derived from cross-correlator 42 which cross-correlates the substantially uncontaminated digital seismic signal on output line 16 with the simulated digital noise data supplied to line 55 by noise simulator 25. In this manner, the coefficients of digital filter 24 are continuously being adjusted to correspond to the changes which take place in the amplitude and phase of the contaminating noise signal present in the seismic data arriving to input 13 of summing network 29.

Cross-correlator 42 uses an adaptive algorithm based on the least-mean-square technique for calculating the coefficients used by digital filter 24 in order to properly filter the digital noise data produced by noise simulator 25 and to provide an error signal to line 43 which is converted to analog form by digital-to-analog converter 70 on its output line 28. The analog error signal when applied to input 27 has the correct frequency, amplitude and phase that are required by summation network 29 for substantially complete suppression of the noise signal that is contaminating the seismic signal component at its input 13. In this manner, feedback loop 26 continuously ensures that the noise signal remains suppressed at the output line 16 even when the ambient noise signal changes with time.

Detailed Description of the Suppression System

Pick up detector 21 continuously monitors noise changes occurring within seismic cable 7. For this purpose there is provided across wires 5 and 6 a pair of resistors 18 having a junction 17 therebetween. The common mode electric noise signal is derived by wire 31 which has one end connected to junction 17. The magnetic noise signal is sensed by a coil 32 having one end connected to ground. The opposite ends of wire 31 and of coil 32 are connected through switches 33 and 34, respectively, to the input 35 of a noise discriminator 22. An electronic switch-select network 30 operates switches 33,34 either simultaneously or consecutively as required to provide maximum noise pickup to input 35 of preamplifier 36. The amplified noise from amplifier 36 is filtered by a band-pass-filter (BPF) 37 which is designed to pass the dominant frequency of the periodic noise component. In the U.S.A., the dominant contaminating noise signal has a frequency which typically is the electric power grid frequency of 60 Hz and/or its harmonics and subharmonics.

The analog filtered noise signal from BPF 37 is applied to a wave shaper 38 which supplies to the output line 39 of discriminator 22 noise data in digital form. Line 39 is connected to the input 41 of a reference noise generator 40 whose output 54 receives a reference noise signal that is applied to simulator 25 which generates a replica of the digital reference noise frequency or frequencies that will be filtered by digital filter 24.

Figure 2:
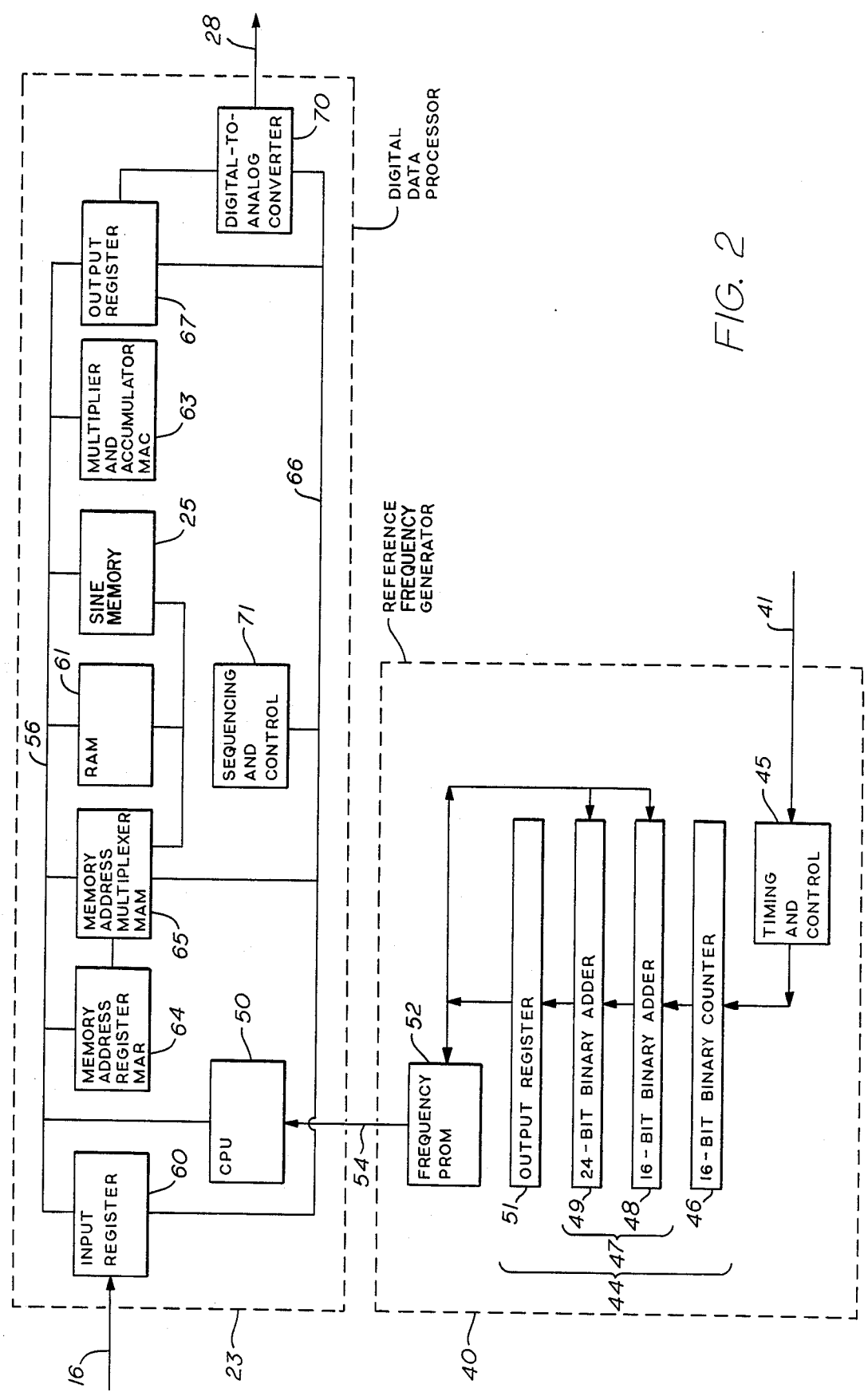
FIG. 2 is an enlarged block diagram representation of the digital data processor network and of the reference noise generator used in the noise suppression system of FIG. 1.

Reference noise generator 40 includes a period counter 44 (FIG. 2) which measures the period of the dominant noise frequency to be suppressed, say theb period of the 60 Hz signal.

The algorithm used by period counter 44 for calculating a running average of the period of the 60 Hz sine wave is:

$$A_{n+1}=A_n+(P-A_n)/T_c$$

Where:
P=60 Hz period measurement,
$A_n$=running average at time n,
$A_{n+1}$=running average at time n+1, and
$T_c$=running average scale value.

A timing-and-control circuit 45 synchronizes the 60 Hz signal with a 1 MHz clock and generates timing signals at each rising edge of the 60 Hz signal.

The period of the noise signal is measured by counting cycles of the 1 MHz clock between the rising edges of the 60 Hz signal. This is accomplished with a simple 16-bit counter chain 46 formed from four 4-bit counters. On each rising edge, counter chain 46 is loaded with all zeros. It then counts 1 MHz cycles until the next rising edge occurs, at which time the accumulated count is fed into a running average filter 47 whose first stage (FIG. 2) is a 16-bit binary adder 48 consisting of four 4-bit adders which perform the calculation $(P-A_n)$.

The second stage 49 of running average filter 47 is a 24-bit binary adder consisting of six 4-bit adders. The output from average filter 47 is $A_n+(P-A_n)/T_c$ which is $A_{n+1}$.

Filter 47 is a running average filter (1-pole R-C type response) which is used to smooth out the output period samples from period counter 46 and to compute a very accurate digital number which represents the period. To simplify the implementation, $1/T_c$ is restricted to powers of 2 which permits the multiplication $1/T_c$ by means of a simple bit-shift. This is implemented by off-setting $A_n$ and adding $(P-A_n)/T_c$.

Register 51 performs the necessary storage to produce the desired output $A_n$ which is applied to a conversion PROM 52 consisting of two 256K EPROMS. PROM 52 converts the measured period number to a frequency number which is the frequency of the selected dominant noise frequency, say 60 Hz.

PROM 52 performs the period-to-frequency conversion according to the equation:

$$F=K/A_n$$

where:
K=scale factor as required, and
F=scaled frequency number of the averaged 60 Hz frequency.

The scaled frequency number F on line 54 is then passed to a CPU interface 50 within the digital data processor 23 to address the noise simulator 25 which consists of a sine-wave look-up PROM which is addressed according to the following calculation:

$$A^{j+1}=A^j+F,$$

where
$A^{j+1}$ is the new address being calculated. It must be rolled around if it exceeds the address space of PROM 25.
$A^j$ is the address from the previous cycle.

F is the step size frequency number generated by conversion PROM 52.

The scaled frequency number can be selectively divided or multiplied by a constant to obtain the frequency numbers of harmonics or subharmonics of the fundamental 60 Hz noise signal.

Since this calculation is done at very regular intervals, a constant F will produce a constant frequency number.

The sine-wave look-up PROM 25 is a 8K×16 bank of read-only memory. Its function is to store the digitized samples of a simulated sine wave required by the algorithm used by cross-correlator 42. Digital filter 24 receives and filters the digital noise data produced by PROM 25.

PROM 25 contains a full period (360°) of the sine wave, which, when addressed properly (i.e., with constant size steps), will generate to a data bus 56 digital data samples of the simulated sine wave having the scaled digital frequency numbers, which may be the fundamental frequency and/or one or more harmonics or subharmonics thereof.

While the noise picked up by detector 21 is being processed by noise discriminator 22, the output seismic signal data on output line 16 of channel 8 is being clocked into an input register 60 at the seismic sampling rate. It is then read into a random access memory (RAM) 61 via data bus 56 and stored for later processing.

RAM 61 is a 2K×16 bank of read/write memory and is used to store input data, intermediate computation products, filter weights, filter time constants, output samples, and any other dynamically changing data required by the algorithm of cross-correlator 42 and by digital filter 24.

Digital filter 24 is preferably a finite-impulse-response (FIR) filter, well known in the art, because it has desirable characteristics such as stability and linear phase response which lend themselves to well behaved implementation.

Other known digital filters, such as infinite impulse-response (IIR) or lattice type filters could be also used in place of the FIR filter. The equations for coefficient calculation and digital filtering would necessarily be different, but the principle of operation would remain substantially the same. This invention is therefore not limited to a particular type of digital filter.

Memory addresses which have been calculated by a multiplier and accumulator (MAC) 63 are clocked into a memory address register 64 (MAR) for subsequent use. MAC 63 performs all arithmetic functions required by the cross-correlator's algorithm and by digital filter 24.

A memory address multiplexer (MAM) 65 selects the source of the memory address. This can be either from register 64 or directly from a control bus 66.

The output samples calculated by digital filter 24 are clocked into an output register (OR) 67 until needed by the digital-to-analog converter (DAC) 70 which converts the filtered digital noise data samples into an analog feedback error signal on line 28.

Sequencing-and-control network 71 generates all clocks, enables memory addresses, and provides other timing and control signals required for proper operation of digital processor 23.

The FIR equation is performed in digital filter 24 as follows:

$$CORR^j = \sum_{i=1}^{N} REF_i^j \times W_i^j,$$

where
CORR$^j$=digital cancellation word at time step j,
REF$_i^j$=the $i^{th}$ value of the monitored frequency at time step j,
W$_i^j$=the $i^{th}$ filter weight at time step j,
N=filter length,
j=time step number, and
i=weight counter.

The weight update calculation is performed in cross-correlator 42, as follows:

$$W_i^{j+1} = W_i^j + 2u_{ac} \times SIG^j \times REF_i^j \text{ for } i=1,2,3 \ldots N,$$

where:
N=#of weights,
$u_{ac}$=weight time constant,
j=time step number,
i=weight counter, and
SIG$_j$=the value of digital sample at time step j, and
W$_i^{j+1}$=the ifilter coefficient at time step j+1.

These calculations are performed for each noise frequency selected to become suppressed within channel 8.

The calculations are performed under the guidance of sequencing-and-control network 71. Data is taken from the appropriate memory 61, mathematically manipulated in MAC 63, and sent back to memory, or to the output of MAC 63, as the filtered digital noise data, which subsequently becomes converted to analog form by DAC 70 as the analog feedback error signal on output line 28.

The noise generator 40 automatically and in near real time adjusts and updates the noise frequencies selected to become suppressed as they change with ambient noise in the environment. In turn, digital filter 24 updates the frequency, amplitude and phase of its output error signal.

The coefficients of digital filter 24 are calculated by cross-correlator 42 so as to maximally cancel the selected noise frequencies from the contaminated seismic signal arriving to input 13 of IFP amplifier 12 in channel 8. Using the digital feedback technique of the invention, the noise component signal can be attenuated by 60 dB or more.

The operational variables can be easily adjusted from a central location via CPU interface 50 which offers the path by which digital filter 24 receives its operational parameters, such as the noise rejection frequency or frequencies to be suppressed, the time-constants for each frequency, the speed of convergence of feedback loop 26, and other constants required for proper operation.

In sum, feedback loop 26 has one input 13 for receiving the contaminated seismic signal, and a second input 27 for receiving the error feedback signal. The error signal is available for algebraic addition in near real time because it is obtained on the basis of data previously sampled.

These two inputs at 13 and 27 are algebraically summed and the difference is amplified by IFP amplifier 12, digitized by analog-to-digital converter 14, filtered by offset filter 15 whose output seismic data on line 16 is cross-correlated with the output noise samples from noise simulator 25 by cross-correlator 42. Digital filter 24 receives its updated coefficients from cross-correlator 42. Filter 24 filters the output noise samples from noise simulator 25, and provides a digital error feedback signal to DAC 70.

The algebraic summation is accomplished preferably prior to IFP amplifier 12 to obtain optimum signal-to-noise enhancement. If desired, the cancellation could be done digitally past converter 14 within channel 8, and such cancellation would be very useful to presently used seismic data acquisition systems. On the other hand, the summation can be effected at any point within channel 8 from its input up to the output of IFP amplifier 12. In sum, the feedback error signal can be in digital form or in analog form prior to the summation, which can be carried out within the analog or digital sections of channel 8.

The accomplished summation substantially and continuously removes the noise signal from the contaminated seismic signal because the error signal is being continuously updated to take account of the changes which occur in the frequency, amplitude, and/or phase of the noise signal being picked up by detector 21.

The present invention has been observed to suppress 60 Hz and multiple harmonics of 60 Hz noise contained within the contaminated seismic signal with 60 dB or more of noise reduction. Seismic signal distortion was minimized by limiting the suppression bandwidth to less than 3 Hz.

While the invention has been illustrated with reference to a single seismic data acquisition channel 8, it will be understood that ordinarily many such channels are employed in the field. The manner of adapting the present invention for a multi-channel acquisition system using time-sharing and multiplexing techniques is well known in the art. This invention is therefore not limited to any particular number of seismic channels.

What we claim is:

1. A system for removing noise from a seismic signal gathering apparatus having at least one analog-digital seismic channel which, in use, receives an input analog seismic signal and a power-grid related analog noise signal having a fundamental frequency, said analog seismic signal and said noise signal combining to form a mixed signal that is processed by said channel into an output digital seismic signal, said system comprising:
   (a) digital detector means, including digital frequency counter means, for detecting said analog noise signal and for producing a fundamental frequency count of said fundamental frequency;
   (b) digital signal generator means for generating a digital reference signal having an instantaneous frequency substantially equal to said fundamental frequency count;
   (c) digital cross-correlator means for continuously cross-correlating said output digital seismic signal with said digital reference signal, thereby producing a digital cross-correlation signal;
   (d) filtering means including an adjustable digital filter which is continuously adjustable in dependence upon the instantaneous values of said cross-correlation signal, thereby continuously and adjustably filtering said digital reference signal into a nulling signal having instantaneous values dependent upon the instantaneous values of said cross-correlation signal, and;
   (e) means, including a difference summing means, for subtracting said nulling signal from said mixed signal, thereby producing a difference signal which is processed by said channel into an output digital seismic signal that is substantially free of said noise signal.

2. The noise removing system according to claim 1, wherein said difference summing means is within said channel; said difference summing means is an analog difference summing means providing an amplified difference signal; and said digital filter means filters said reference signal into a digital nulling signal; and further including:
   digital-to-analog converter means for converting said digital nulling signal into an analog nulling signal.

3. The noise removing system according to claim 2, wherein
   said noise signal additionally includes a number of harmonics and sub-harmonics of said fundamental frequency.

4. The noise removing system according to claim 3, wherein
   said digital signal generator means include:
   digital multiplier means for multiplying and dividing said fundamental frequency count by integer numbers to obtain a number of digital frequencies corresponding to said number of harmonics and sub-harmonics;
   programmable storage means for storing a digital sine wave, said storage means, when addressed by said frequency count and by said frequencies, providing (1) a digital sine wave having a frequency corresponding to said fundamental frequency count, and (2) digital sine waves corresponding to said harmonics and sub-harmonics; and
   said digital sine wave and said digital sine waves together forming said reference signal.

5. The noise removing system, according to claim 4, wherein said digital filter filters said reference signal into a digital nulling signal;
   digital-to-analog converter means convert said digital nulling signal into an analog nulling signal;
   said channel has an analog section and a digital section;
   said analog section including;
   a preamplifier, a filter, a sample-and-hold network, and said summing means is an instantaneous floating-point difference amplifier having a first input which receives the output samples from said sample-and-hold network, a second input which receives said analog nulling signal, and an output which provides said amplified difference signal;
   said digital section including;
   an analog-to-digital converter for converting said amplified difference signal into a digital difference signal; and
   means including an offset filter for filtering said digital difference signal into said output digital seismic signal.

6. The noise removing system, according to claim 5, wherein said digital filter is a finite-impulse-response filter; said digital detector means include a pair of impedances connected in series across said channel input and having a junction therebetween, and further including:
   a period counter having means for amplifying, filtering and squaring said detected noise signal;
   a clock for providing a clock signal;
   means for synchronizing said squared noise signal with said clock signal and for generating timing signals at each rising edge of said squared noise signal;

means for counting cycles of said clock signal between said timing signals, thereby providing a digital period count of said squared noise signal; and means for converting said period count into said frequency count.

7. The noise removing system according to claim 6, wherein said means for converting said period count into said frequency count include a running average filter for averaging and converting said digital period count into a digital frequency count of said fundamental frequency of said noise signal.

8. The noise removing system according to claim 7, wherein said digital storage means is a sine memory containing samples of a sine wave.

9. The noise removing system according to claim 8, wherein said sine memory contains samples of at least one full cycle of said sine wave.

10. A method for removing noise from a seismic signal gathering system having at least one analog-digital seismic channel which, in use, receives an input analog seismic signal and a power-grid related analog noise signal having a fundamental frequency, said analog seismic signal and said noise signal combining to form a mixed signal that is processed by said channel into an output digital seismic signal, comprising the steps of:

(a) continuously digitally detecting said noise signal and producing a fundamental frequency count of said fundamental frequency;

(b) generating a digital reference signal having an instantaneous frequency substantially equal to said fundamental frequency count;

(c) continuously cross-correlating said output digital seismic signal with said digital reference signal and producing a digital cross-correlation signal;

(d) continuously adjustably filtering said reference signal into a nulling signal having instantaneous values dependent upon the instantaneous values of said cross-correlation signal;

(e) subtracting said nulling signal from said mixed signal and producing a difference signal; and (f) processing said difference signal into an output digital seismic signal that is substantially free of said noise signal.

11. The method for removing noise from a seismic signal gathering system in accordance with claim 10, wherein said mixed signal is an analog signal, and said nulling signal is a digital nulling signal, and further including the steps of:

converting said adjusted digital nulling signal into an analog nulling signal; and subtracting said analog nulling signal from said analog mixed signal to produce an analog difference signal.

12. A noise-corrected seismic signal gathering system, comprising:

(a) at least one analog-digital seismic channel which, in use, receives an input analog seismic signal and a power-grid related analog noise signal having a fundamental frequency, said analog seismic signal and said noise signal combining to form a mixed signal, and said channel including analog-digital signal processing means for processing said mixed signal into an output digital seismic signal;

(b) digital detector means, including frequency counter means, for continuously detecting said analog noise signal and for producing a fundamental frequency count of said fundamental frequency;

(c) first digital means, including an adjustable digital filter having a first input and a second input;

(d) second digital means, including a digital signal generator for providing to said first input of said digital filter a digital reference signal having an instantaneous frequency corresponding to said fundamental frequency count;

(e) digital cross-correlator means for continuously cross-correlating said output digital seismic signal with said digital reference signal, thereby continuously providing a digital cross-correlation signal to said second input of said adjustable digital filter, and said filter adjustably filtering said digital reference signal into a nulling signal having instantaneous values dependent upon the instantaneous values of said cross-correlation signal; and (f) a difference summing means having a first input receiving said mixed signal and a second input receiving said nulling signal, and said summing means subtracting said nulling signal from said mixed signal and providing a difference signal to said processing means which process said difference signal into an output digital seismic signal that is substantially free of said noise signal.

13. A noise-corrected seismic signal gathering system, comprising:

(a) at least one seismic channel which, in use, receives an input seismic signal and a power-grid related noise signal having a fundamental frequency, said seismic signal and said noise signal combining to form a mixed signal, and said channel including signal processing means for processing said mixed signal into an output seismic signal;

(b) detector, means including a frequency detector coupled to said channel, for continuously detecting said noise signal;

(c) first means, including an ajustable filter having a first input, a second input, and adjustable filter coefficients;

(d) second means including a filter coefficient calculator having a first input, a second input coupled to said channel, and an output coupled to said second input of said adjustable filter;

(e) third means including a reference signal generator for simultaneously providing a reference signal to said first input of said filter and to said first input of said coefficient calculator;

(f) said filter coefficient calculator continuously cross-correlating said output seismic signal with said reference signal, and continuously providing a cross-correlation signal to said second input of said adjustable filter, thereby continuously adjusting said filter coefficients in accordance with the instantaneous values of said cross-correlation signal, and said filter adjustably filtering said reference signal into a nulling signal; and (g) a difference summing means having a first input receiving said mixed signal and a second input receiving said nulling signal, and said summing means substracting said nulling signal from said mixed signal and providing a difference signal to said processing means which process said difference signal into an output seismic signal that is substantially free of said noise signal.

14. The noise-corrected seismic signal gathering system, according to claim 13, wherein
said frequency detector continuously provides a frequency count of said fundamental frequency;
said reference signal has an instantaneous frequency which is substantially equal to said fundamental frequency count; and
said difference summing means is within said channel.

15. The noise-corrected seismic signal gathering system according to claim 14, wherein
said noise signal additionally includes a number of harmonics and sub-harmonics of said fundamental frequency.

16. A noise-corrected seismic signal gathering system, comprising:
(a) at least one analog-digital seismic channel which, in use, receives an input analog seismic signal and a power-grid related noise signal having a fundamental frequency, said seismic signal and said noise signal combining to form a mixed signal, and said channel including signal processing means for processing said mixed signal into an output digital seismic signal;
(b) digital detector means, including a digital frequency detector, coupled to said channel for continuously detecting said noise signal;
(c) first digital means, including an adjustable digital filter having a first input, a second input, and adjustable filter coefficients;
(d) second digital means including a filter coefficient calculator having a first input, a second input coupled to said channel, and an output coupled to said second input of said adjustable filter;
(e) third digital means including a reference signal generator for simultaneously providing a reference signal to said first input of said filter and to said first input of said coefficient calculator;
(f) said filter coefficient calculator continuously cross-correlating said output digital seismic signal with said reference signal, and continuously providing a cross-correlation signal to said second input of said adjustable filter, thereby continuously adjusting said filter coefficients in accordance with the instantaneous values of said cross-correlation signal, and said digital filter adjustably filtering said reference signal into a nulling signal; and
(g) a difference summing means having a first input receiving said mixed signal and a second input receiving said nulling signal, and said summing means subtracting said nulling signal from said mixed signal and providing an amplified difference signal to said processing means which process said difference signal into an output digital seismic signal that is substantially free of said noise signal.

17. The noise-corrected seismic signal gathering system, according to claim 16, wherein
said digital frequency detector continuously provides a frequency count of said fundamental frequency of said noise signal; said reference signal has an instantaneous frequency substantially equal to said fundamental frequency count; and said difference summing means is within said channel.

18. The noise-corrected seismic signal gathering system according to claim 17, wherein said digital filter filters said reference signal into a digital nulling signal, and said summing means is an analog difference summing means, and further including:
digital-to-analog converter means for converting said digital nulling signal into an analog nulling signal.

19. The noise-corrected seismic signal gathering system according to claim 18, wherein
said noise signal additionally includes a number of harmonics and sub-harmonics of said fundamental frequency.

20. The seismic signal gathering system according to claim 19, wherein said digital reference generator includes:
digital multiplier means for multiplying and dividing said fundamental frequency count by integer numbers, thereby producing a plurality of digital frequencies corresponding to said harmonics and sub-harmonics of said fundamental frequency count;
programmable storage means for storing a digital sine wave, said storage means, when addressed by said frequency count and by said plurality of digital frequencies, providing (1) a digital sine wave having a frequency corresponding to said fundamental frequency count, and (2) digital sine waves corresponding to said harmonics and sub-harmonics; and
said digital sine wave and said digital sine waves together forming said reference signal.

21. The seismic signal gathering system according to claim 20, wherein
said channel has an analog section and a digital section;
said analog section including:
a preamplifier, a filter, a sample-and-hold network, and said summing means is an instantaneous floating-point difference amplifier having a first input which receives the output samples from said sample-and-hold network, a second input which receives said analog nulling signal, and an output which provides said amplified difference signal;
said digital section including:
an analog-to-digital converter for converting said amplified difference signal into a digital difference signal; and
means including an offset filter for filtering said digital difference signal into said output digital seismic signal.

22. The seismic signal gathering system according to claim 20, wherein
said digital filter is a finite-impulse-response filter; and
said digital frequency detector including: a pair of impedances connected in series across said channel input and having a junction therebetween; a period counter including means for amplifying, filtering and squaring said detected noise signal; a clock for providing a clock signal; means for synchronizing said squared noise signal with said clock signal and for generating timing signals at each rising edge of said squared noise signal; means for counting cycles of said clock signal between said timing signals, thereby providing a digital period count of said squared noise signal; and means for converting said period count into said frequency count.

23. The seismic signal gathering system according to claim 22, wherein
said means for converting said period count into said frequency count include a running average filter for averaging and converting said digital period count into a digital frequency count of said fundamental frequency of said noise signal.

24. The seismic signal gathering system according to claim 20, wherein
   said programmable storage means is a sine memory containing samples of a sine wave.

25. The seismic signal gathering system according to claim 24, wherein
   said sine memory contains samples of at least one full cycle of said sine wave.

26. The seismic signal gathering system according to claim 16, wherein
   said digital filter is a finite-impulse-response filter.

* * * * *